(12) United States Patent
Gryskiewicz

(10) Patent No.: US 6,937,291 B1
(45) Date of Patent: Aug. 30, 2005

(54) ADAPTIVE VIDEO SCALER

(75) Inventor: Paul S. Gryskiewicz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 09/652,694

(22) Filed: Aug. 31, 2000

(51) Int. Cl.[7] ............................................. H04N 9/74
(52) U.S. Cl. .................. 348/581; 348/448; 348/458; 348/714; 348/716; 345/660; 345/668; 358/451; 382/307
(58) Field of Search ................................ 348/581, 443, 348/445–446, 448, 458–459, 714–721; H04N 9/74; 345/660–670, 555, 560; 382/298, 307, 297; 358/451, 426.06

(56) References Cited

U.S. PATENT DOCUMENTS

| 5,406,311 | A | * | 4/1995 | Michelson | 345/547 |
| 5,442,460 | A | * | 8/1995 | Rhodes | 348/441 |
| 5,742,349 | A | * | 4/1998 | Choi et al. | 348/443 |
| 5,781,242 | A | * | 7/1998 | Kondo et al. | 348/441 |
| 5,784,113 | A | * | 7/1998 | Rhodes | 348/441 |
| 5,815,168 | A | * | 9/1998 | May | 148/682 |
| 5,920,495 | A | * | 7/1999 | Hicok et al. | 708/308 |
| 5,963,261 | A | * | 10/1999 | Dean | 348/446 |
| 6,011,566 | A | * | 1/2000 | Salamon | 345/600 |
| 6,204,887 | B1 | * | 3/2001 | Hiroi | 348/565 |
| 6,239,847 | B1 | * | 5/2001 | Deierling | 348/581 |
| 6,339,434 | B1 | * | 1/2002 | West et al. | 345/667 |
| 6,411,333 | B1 | * | 6/2002 | Auld et al. | 348/441 |
| 6,411,334 | B1 | * | 6/2002 | Yeh et al. | 348/445 |
| 6,421,698 | B1 | * | 7/2002 | Hong | 348/415.1 |
| 6,501,484 | B1 | * | 12/2002 | Porter | 345/667 |
| 6,501,508 | B1 | * | 12/2002 | Song et al. | 348/441 |
| 6,556,193 | B1 | * | 4/2003 | Auld et al. | 345/418 |
| 6,587,158 | B1 | * | 7/2003 | Adams et al. | 348/716 |
| 6,801,674 | B1 | * | 10/2004 | Turney | 382/298 |

* cited by examiner

Primary Examiner—Brian Yenke
(74) Attorney, Agent, or Firm—Trop, Pruner & Hu, P.C.

(57) ABSTRACT

An adaptive filter is adjustable for performing scaling operations. During a scaling operation, the adaptive filter stores scaled data in a memory such that more data samples may be retrieved during a subsequent scaling operation. The size of a finite impulse response filter used during the subsequent scaling operation may be adjusted to access the additional data samples.

18 Claims, 7 Drawing Sheets

ADAPTIVE VIDEO SCALER

BACKGROUND

This invention relates to video scaling operations.

A digital video scaler is a device that accepts an input image and creates a new output image of different dimensions. A digital video scaler can scale in either the horizontal or the vertical direction.

One objective of digital video scalers is to avoid aliasing artifacts. When the video signal is sampled, the signal is typically sampled at greater than twice the frequency of the signal, known as the Nyquist sampling rate. This ensures the aliasing of the signal is avoided. Aliasing causes unwanted distortion of the original signal. For example, a high-frequency signal, sampled too infrequently, may contain low frequencies that really aren't there.

Whether the size of a video image is increased or decreased, aliasing may be a problem. For example, where an image is scaled down 2:1, say, by discarding half the pixels representing the image, the sampling rate has also been cut in half relative to the original Nyquist sampling rate. The image after scaling may possibly include aliasing artifacts.

Digital video scalers thus typically employ finite impulse response (FIR) filters to scale the video images. An FIR filter receives many data points, or pixels, to generate a single output pixel. A simple averaging FIR filter may receive two or more pixels, average them, and produce an output pixel, for example. The result is a filtered signal.

To scale a signal, the FIR filter receives discrete representations of the signal, or data points, one after the other. The FIR filter performs operations on the data points to produce a resulting data point. Once the signal is filtered, the scaler may discard some of the pixels, yet the resulting scaled output is free of aliasing artifacts.

For video images, the data points are typically pixels. For example, under one digital video standard, an image is sampled at 13.5 MHz. This sampling rate produces 30 frames (or 60 interlaced fields) of image data where the frames include a matrix of pixels, with 720 horizontal pixels by 480 vertical pixels or 480 rows of pixels. Each pixel is received sequentially, starting with all the pixels on the first row, then all the pixels on the second row and so on.

To scale a video image in the horizontal direction, the FIR filter receives each pixel in a selected row, until the FIR filter is filled. The ordering of the pixels received is convenient for horizontal scaling. A simple first-in-first-out (FIFO) memory may receive the pixels into the FIR filter, for example.

Scaling the video image in the vertical direction, however, is not as simple as with horizontal scaling. The FIR filter does not receive the pixels in a convenient way for vertical scaling. Under the above digital video standard, for example, the vertical scaler receives a first pixel in the first row. The next 719 pixels are in the horizontal, not vertical, direction of the frame. Thus, the vertical scaler must wait for the 720th pixel after the first pixel, discard 720 pixels immediately following that then retrieve every 720th pixel until all the vertical pixels are retrieved.

Since the video data is sent horizontally, vertical scalers typically retrieve the pixels from line memories rather than as the original input stream. The vertical scaler may retrieve each vertical pixel from the line memories to perform the scaling operation.

The cost impact of vertical scaling is evident. Higher-quality FIR filters generally include more taps than lower quality FIR filters. Since the amount of available data for processing is less for vertical scaling than for horizontal scaling, vertical scalers typically employ less sophisticated FIR filters (e.g., ones with fewer taps) while horizontal scalers operating on the same video data stream may include many more taps. Where high-quality horizontal scaling may be achieved with a simple FIFO, vertical scaling of a similar quality requires a substantial amount of memory.

Thus, there is a continuing need to improve the efficiency of video scaling operations.

DETAILED DESCRIPTION

In accordance with the several embodiments described herein, an adaptive filter features both horizontal and vertical scaling of an incoming video data stream. The adaptive filter automatically changes the density of data stored in the available memory in real time, following horizontal scaling, such that more efficient vertical scaling may subsequently be performed. Where the amount of stored data increases, the vertical scaler may accordingly support additional taps, allowing for better alias suppression. Where the size of the vertical scaler is increased, the adaptive filter may dynamically configure new coefficients for the vertical scaler. The efficient use of the memory during scaling operations may permit lower-cost alternatives, such as on-chip memory, to be used in the adaptive filter.

Figure 1:
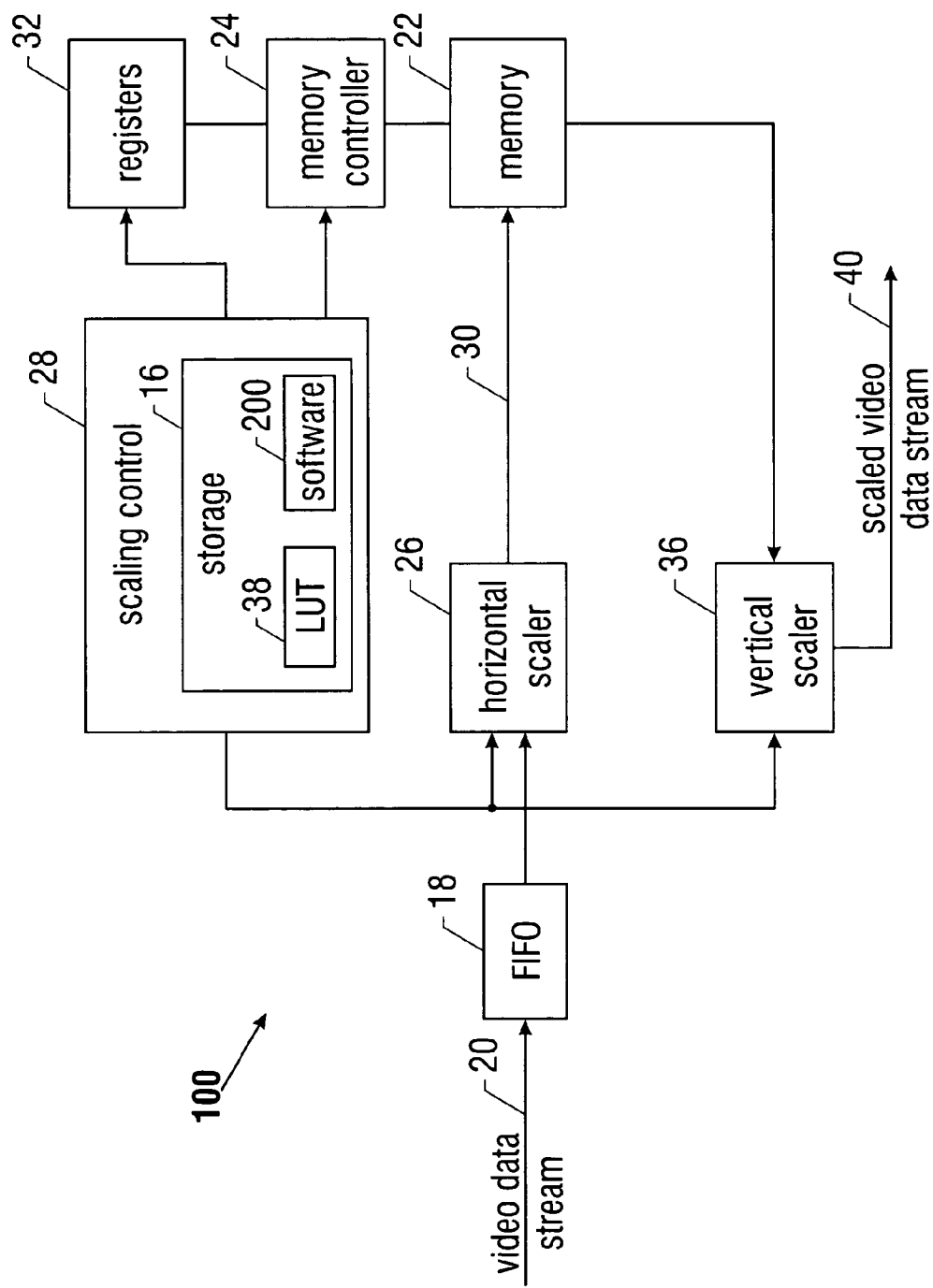
FIG. 1 is a block diagram of a system according to one embodiment of the invention.

In FIG. 1, according to one embodiment, an adaptive filter 100 receives a video data stream 20 for performing filtering operations. The adaptive filter 100 may receive the video data stream 20 from a video decoder (not shown) or from an expansion port used to capture the video (not shown).

In one embodiment, the video data stream 20 is a digital video stream. A digital video stream consists of video pixels being transmitted sequentially in the horizontal direction. Pixels are sent from left to right, then after one row is transmitted, the next row is sent until the entire image has been sent. For example, one digital video signal transmits thirty frames per second, where each frame consists of 720 active horizontal video pixels and 480 rows or vertical pixels.

In one embodiment, the adaptive filter 100 receives the video data stream 20 into a first-in-first-out (FIFO) memory 18, before being received into a horizontal scaler 26. In one embodiment, the horizontal scaler 26 is a finite impulse response (FIR) filter, which receives pixels from the FIFO 18 corresponding to the incoming video data stream 20. FIR filters are described in connection with FIG. 3, below. In one embodiment, the FIFO 18 stores a number of pixels corresponding to the number of taps (size) of the FIR filter located in the horizontal scaler 26. The horizontal scaler 26 produces a horizontally scaled video data stream 30.

In one embodiment, the horizontally scaled video data stream 30 is stored in a memory 22 of the adaptive filter 100. The memory 22 may be a random access memory such as dynamic random access memory (DRAM), synchronous DRAM (SDRAM), static ram (SRAM), or Rambus® DRAM (RDRAM). The memory 22 comprises a plurality of bits for storing data. In one embodiment, the memory 22 is embedded in other circuitry of the system 100, as on-chip memory. On-chip memory may be preferred over a dedicated memory for designs where board space and cost are considerations, in some embodiments.

Figure 2:
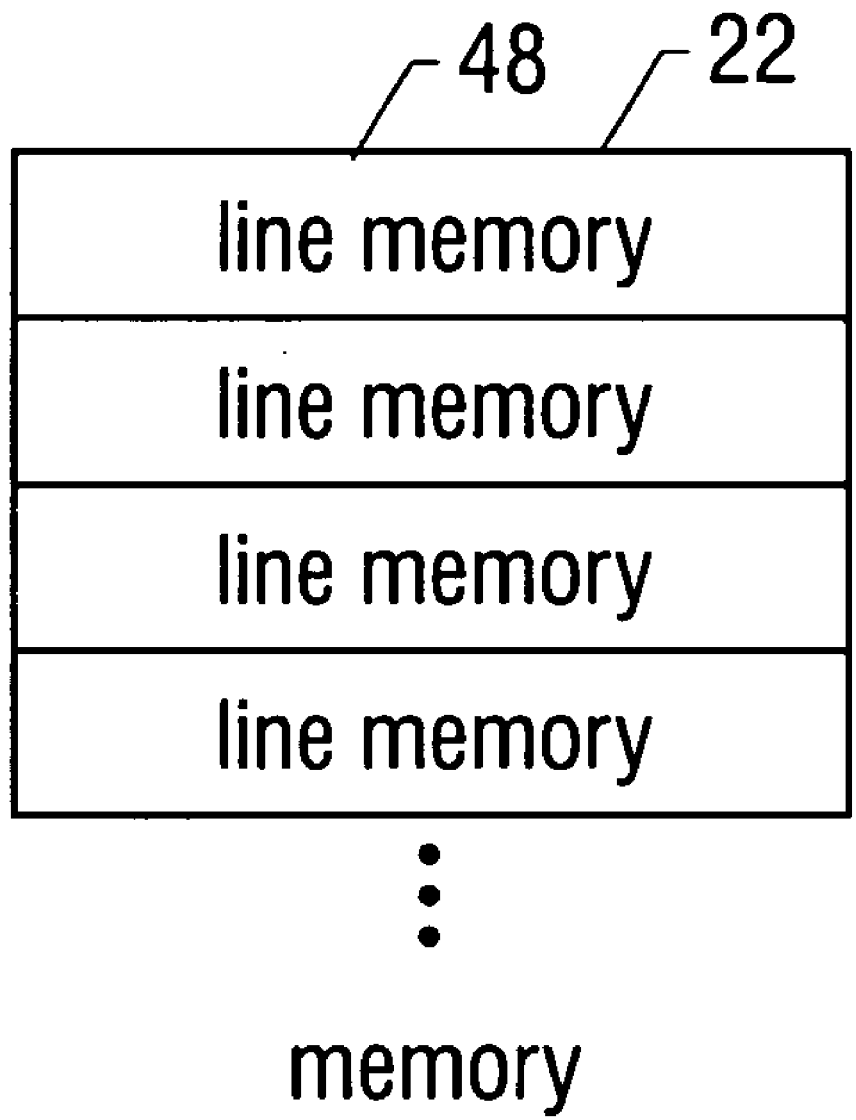
FIG. 2 is a block diagram of the memory according to one embodiment of the invention.

The memory 22 may be organized to facilitate access thereto, in some embodiments. For example, as shown in FIG. 2, the memory 22 is divided into a plurality of line memories 48, wherein each line memory 48 is a predetermined length. In one embodiment, the line memory 48 is an amount of memory that may store a single row of video data.

Accordingly, the size of the line memory 48 may change upon receiving each new video data stream into the system 100. For example, for a video signal with a frame size of 720×480 comprising three bytes of data per pixel, the line memory 48 is 2160 bytes long (720×3). A video signal with 800×600 resolution frames which includes two bytes of data per pixel stores each row of data in a 1600-byte line memory 48 (800×2). The line memory 48 is dynamically adjusted to accept a row worth of video data, according to one embodiment.

A memory controller 24 is coupled to the memory 22, for controlling memory access. In one embodiment, the memory controller 24 may be programmed to change how rows of pixel data are both stored and retrieved in the line memories 48. In one embodiment, the memory controller 24 is programmed, based upon the scaling operation performed in the horizontal scaler 26, to facilitate efficient vertical scaling operations. Accordingly, a plurality of registers 32 are coupled to the memory controller 24. One register 32, for example, may identify the number of rows of pixel data stored in each line memory 48. A second register 32 may indicate offset addresses in the line memory 48 for accessing each row. These examples illustrate two of a number of uses for the registers 32 by the memory controller 24, to facilitate memory access before and after scaling operations.

In one embodiment, the memory 22 is coupled to a vertical scaler 36. Like the horizontal scaler 26, the vertical scaler 36 uses an FIR filter which scales frames of the incoming video data stream 20 in the vertical direction, producing a scaled video data stream 40. In one embodiment, the scaled video data stream 40 is scaled in both the horizontal and vertical directions.

A scaling control unit 28 is coupled to both the horizontal scaler 26 and the vertical scaler 36, for dynamically controlling the scaling operations in real time. In one embodiment, the scaling control unit 28 is a processor-based system which controls the filter size (number of taps) for each of the horizontal and vertical scalers 26 and 36. The scaling control unit 28 further includes storage 16, such as for software 200 running in the scaling control unit 28.

In one embodiment, the scaling control unit 28 includes a look-up table (LUT) 38, for retrieving the tap coefficients for the FIR filters. In addition to controlling the horizontal scaler 26 and the vertical scaler 36, the scaling control unit is coupled to the memory controller 24, for automatically changing the number of rows of pixel data that are stored in the memory 22.

In one embodiment, the adaptive filter 100 performs video scaling operations on the incoming video data stream 20. The adaptive filter 100 may thus be used where a video image is "down-sized," such as for supporting picture-in-picture (PIP), or to add additional graphics or other video data to the video image, such as display of stock quotes simultaneous with a television broadcast, for example.

Instead of processing the video data stream 20 through an FIR filter, a less sophisticated approach to scaling may be to simply discard every other pixel of the incoming video data stream 20, or, in other words, perform no filtering at all. As explained above, however, the resulting image may include aliasing artifacts which obscure the image.

FIR filters avoid aliasing artifacts by using as many of the data samples as possible to perform scaling operations. An FIR filter may, for example, receive data samples, in this case, pixels, from the video data stream 20 and multiply the data samples by constant values, known as tap coefficients. The products of the multiplication are then summed together to produce a result. (The FIR filter essentially performs a "dot product," a well-known mathematical operation.) Because the high-frequency components are filtered out (reduced), the possibility of aliasing artifacts in the scaled image may be reduced.

Figure 3:
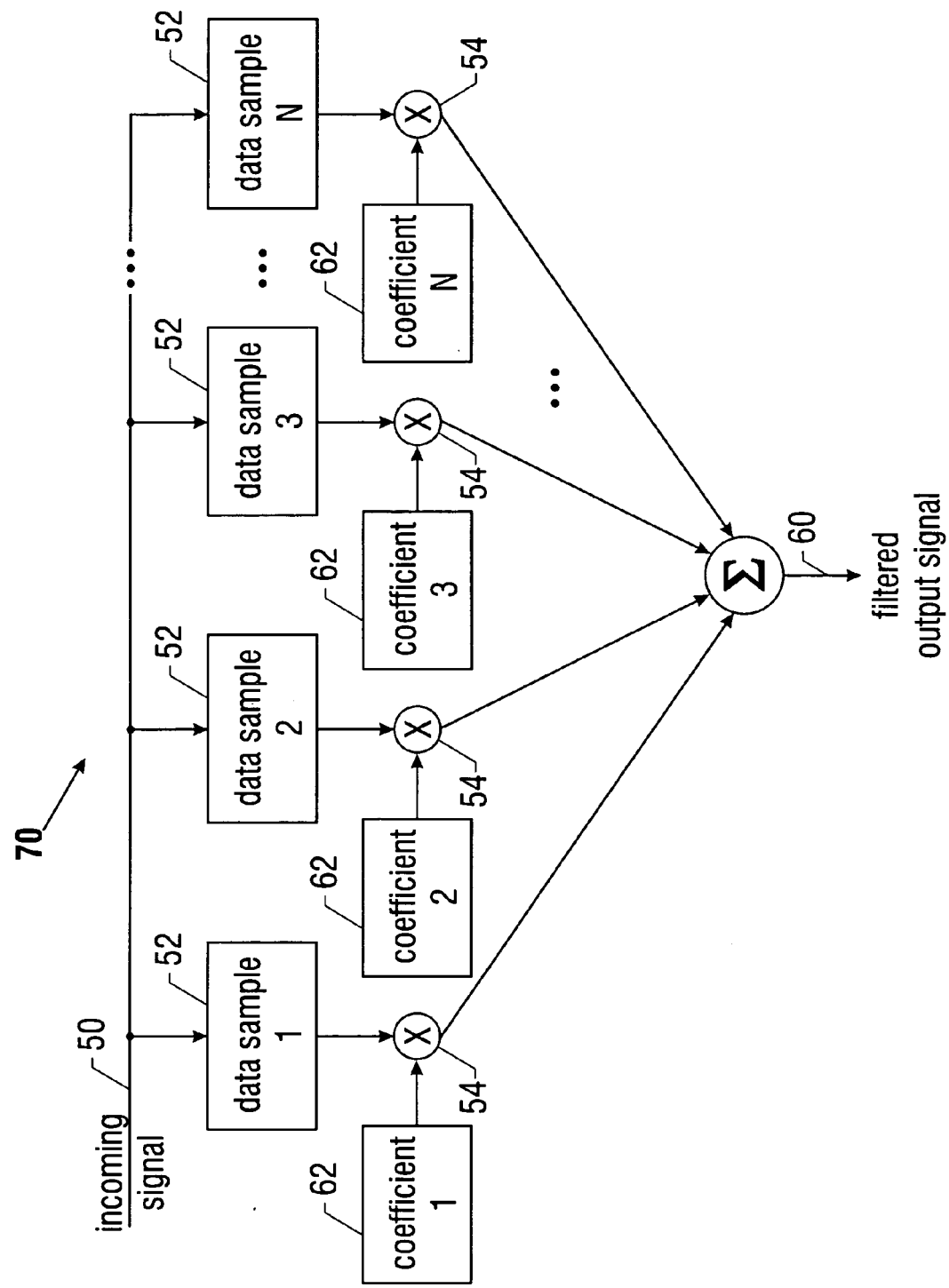
FIG. 3 is a block diagram of a finite impulse response filter according to one embodiment of the invention.

In FIG. 3, an FIR filter 70 according to one embodiment receives an incoming signal 50, extracts a plurality of data samples 52 from the incoming signal, and multiplies each data sample 52 by a coefficient 62. The FIR filter 70 includes N data samples 52 as well as N coefficients 62, each producing a product 54. The products 54 are then summed together to produce a filtered output signal 60.

The coefficients 62 of the FIR filter 70 are known as "taps." The size of the FIR filter 70 corresponds to the number of taps. Thus, the FIR filter 70 of FIG. 3 is an N-tap filter.

In designing the FIR filter 70, a desired output signal, or frequency response, is determined and, based upon the desired response, the coefficients 62 are calculated. The filtered output signal 60 produced using the coefficients 62 is typically an approximation of the desired frequency response. The coefficients 62 change depending on the size of N. For example, a two-tap FIR filter 70 employs different coefficients 62 than a three-tap FIR filter 70. Having more taps tends to produce a higher quality filtered output signal 60, up to a point. Increasing the number of taps also increases the computational operations performed by the FIR filter 70. Finding an optimal number of taps the operation being performed is thus a key design issue.

Because a frame of video data is collected and transmitted, row by row, an FIR filter performing horizontal scaling has ready access to the data samples used to compute the filtered output signal. Such an FIR filter may typically include 65 to 80 taps. An FIR filter performing vertical scaling, by contrast, typically includes only two to five taps, due to the additional delay associated with retrieving the data samples.

According to one embodiment, the adaptive filter 100 may optimize the use of the memory 22 following a horizontal scaling operation by varying the density of stored information. By effectively increasing the available memory 22 accessible to the vertical scaler 36, the number of data samples 52 that may be stored in the memory 22 is increased. Accordingly, the size of the FIR filter 70 in the vertical scaler 36 may be increased for performing vertical scaling. By increasing the size (e.g., the number of taps) of the vertical scaler 36 without increasing the amount of memory 22 needed to perform vertical scaling, the effective cost of the adaptive filter 100 is decreased while the quality of the filtered output signal 60 may actually improve.

In some prior art systems, an entire frame of video data may be stored in a frame buffer memory prior to performing any scaling or following the horizontal scaling operation. This results in at least one video frame of delay, which is not a real-time operation. Further, memory for storing an entire frame of video data is typically not small. For example, a video frame with a resolution of 720×480 which stores three bytes per pixel is over one megabyte in size. On-board memories, however, typically store up to 2 kilobytes, 4 kilobytes, or 8 kilobytes of data.

In contrast, according to one embodiment, the adaptive filter 100 performs real-time operations during horizontal and vertical scaling. The operation to increase the density of stored data in the memory 22, following the horizontal scaling operation, is performed in real-time. Likewise, any adjustment to the size of the FIR filter 70 in the vertical scaler 36 is made in real-time. Additionally, the adaptive filter 100 makes efficient use of the memory 22, making it possible for smaller memories, such as on-board memory, to be employed for performing these real-time operations.

Figure 4A:
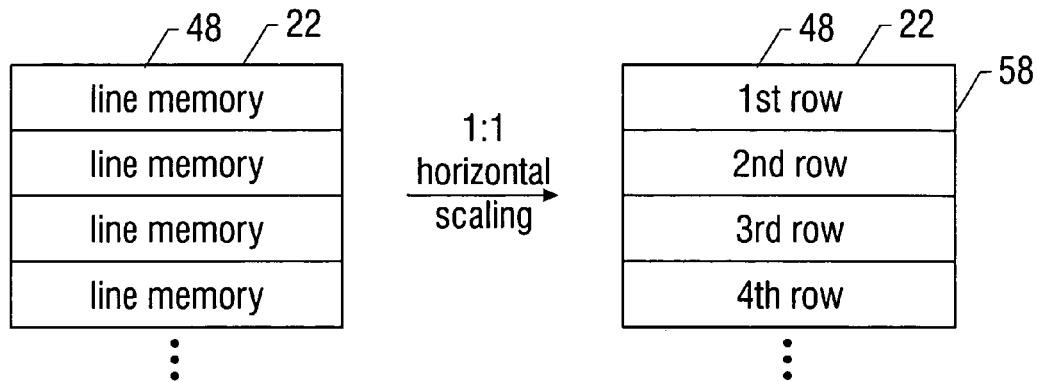
FIGS. 4A–4C are diagrams illustrating storage of the video data stream following horizontal scaling according to a prior art embodiment.
Figure 4B:
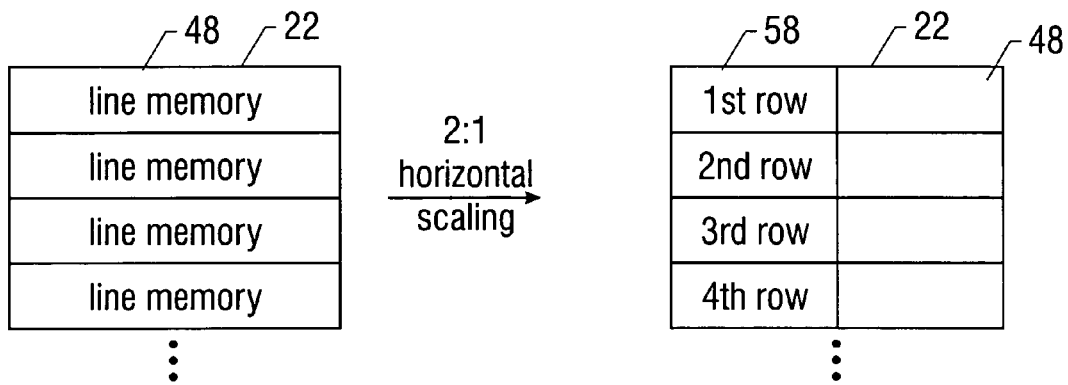
Figure 4C:
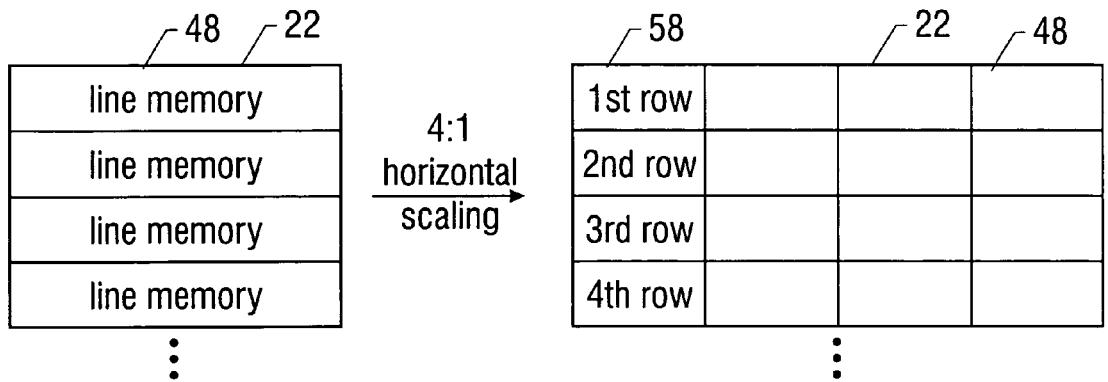

In FIGS. 4A–4C, pixels from the incoming video data stream 20 are stored in the memory 22 according to a typical prior art embodiment. Where no horizontal scaling is performed, e.g., 1:1 horizontal scaling, a first row 58 of the video data stream is stored in the first line memory 48, followed by a second row 58 stored in the second line memory 48, and so on, one row after another. For example, under the digital video standard described above, 720 pixels, corresponding to the first row 58 of the incoming video data stream 20, are stored in the first line memory 48 of the memory 22. Thus, there is direct correspondence between the line memory 58 number (e.g., first, second, third . . . ) and the row 48 of the frame being stored.

Where the horizontal scaler 26 performs 2:1 horizontal scaling, the resulting pixels stored in the memory 22 occupy only half of the available space, as illustrated in FIG. 4B. The first row 58 of video data is stored in the first line memory 48, as before. Because the row 58 occupies only half of the available line memory 48, a second row 58 may be stored in the first line memory 48. This is not what happens, however. Instead, the second row 58 is stored in the second line memory 48, not the first. As with 1:1 horizontal scaling, the first row 58 is stored in the first line memory 48, the second row 58 is stored in the second line memory 48, the third row 58 is stored in the third line memory 48, and so on. Where 2:1 horizontal scaling is performed, half the available memory 22 is unused. Where 4:1 horizontal scaling is performed, only one-fourth of the memory 22 stores the pixel data, leaving three-fourths of the memory 22 empty, as depicted in FIG. 4C.

According to one embodiment, the adaptive filter 100 optimizes the use of the memory 22 by increasing the density of data stored following horizontal scaling operations. For example, in FIG. 5A, following 2:1 horizontal scaling, the first and second rows 58 are stored in the first line memory 48; the third and fourth rows 58 are stored in the second line memory 48; the fifth and sixth rows 58 are stored in the third line memory 48, and so on. Accordingly, twice as many rows 58 of pixel data are stored in each line memory 48 as during the 2:1 horizontal scaling operation described in FIG. 4B.

Figure 5A:
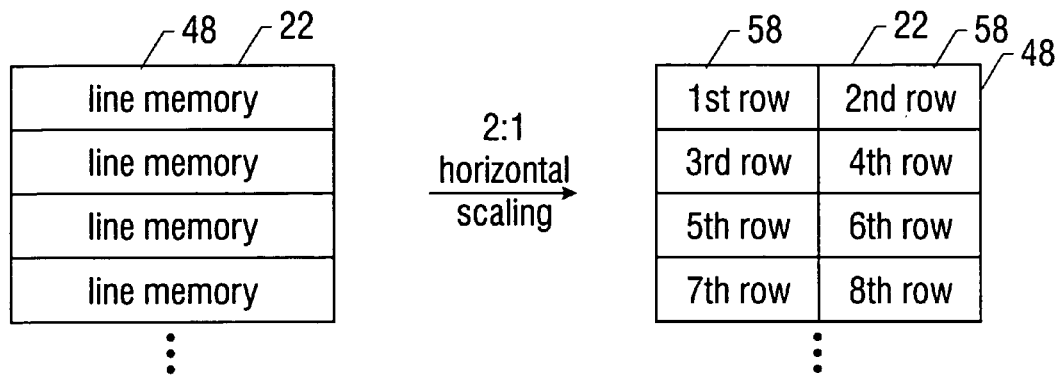
FIGS. 5A–5C are diagrams illustrating storage of the video data stream following horizontal scaling according to one embodiment of the invention.
Figure 5B:
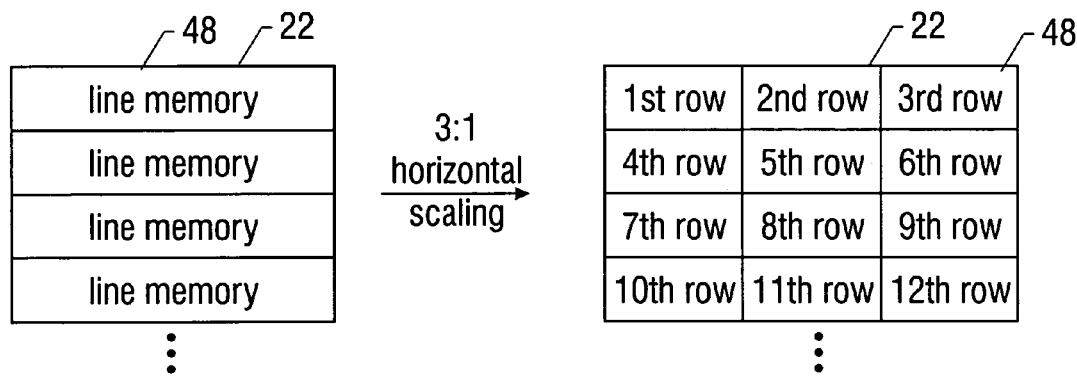

In FIG. 5B, following a 3:1 scaling operation, the first, second and third rows 58 are stored in the first line memory 48, the fourth, fifth and sixth rows 58 are stored in the second line memory, and so on. Three times as many rows 58 are stored, in one embodiment, as when no scaling operation takes place. Likewise, in FIG. 5C, four times as many rows 58 are stored in each line memory 48 following a 4:1 scaling operation.

In one embodiment, the adaptive filter 100 performs vertical scaling following the horizontal scaling operation. By first storing the pixels of the horizontally scaled video data stream 30 in the manner shown in FIGS. 5A–5C, the number of available data samples 52 to be used by the FIR filter 70 of the vertical scaler 36 is increased. For example, in FIGS. 4A–4C, the same number of rows 58 is stored in the memory 22, whether horizontal scaling was performed or not. In each case, four rows 58 of pixel data, and thus four data samples 52, are available for vertical scaling. In FIG. 5A, however, because eight lines 58 are stored in the memory 22, eight data samples 52 are available for vertical scaling. Likewise, in FIGS. 5B and 5C, twelve and sixteen data samples 52, respectively, are available for scaling in the vertical direction.

The memory controller 24 controls accesses to and from the memory 22. In one embodiment, the scaling control unit 28 directs the memory controller 24 to change where each row 58 is stored, according to a prior horizontal scaling operation. Put another way, the number of rows 58 stored for each line memory 48 may be adjusted by the scaling control unit 28. In one embodiment, the registers 32 are updated by the scaling control unit 28 following horizontal scaling. The memory controller 24 may access the registers 32 to determine how subsequent accesses to the memory 22 are made.

Further, the scaling control block 28, in one embodiment, controls both the number of taps and the coefficients 62 used in the FIR filter 70 of the vertical scaler 36. Once the number of rows 58 stored in the memory 22 is known, the number of taps used in the FIR filter 70 of the vertical scaler 36 may be increased accordingly.

In one embodiment, the scaling control unit 28 recalculates the coefficients 62 of the FIR filter 70 in accordance with the increased filter size. In one embodiment, the scaling control unit 28 supplies the new coefficients 62 to the vertical scaler 36 by retrieving the coefficients 62 from the LUT 38. In a second embodiment, the scaling control unit 28 retrieves the coefficients 62 from a source external to the adaptive filter 100.

The registers 32 of the adaptive filter 100 may further supply the scaling control unit 28 as well as the memory controller 24 with information relating to the scaling operations being performed. For example, the registers 32 may indicate the size of the scaling operation being performed (e.g., 3:1), the size of the memory 22, the current number of taps in the vertical scaler 36, and so on.

Figure 5C:
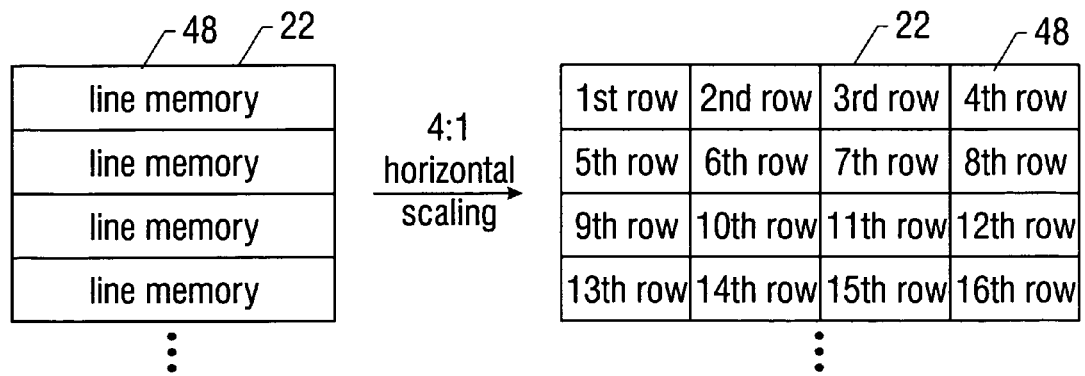
Figure 6:
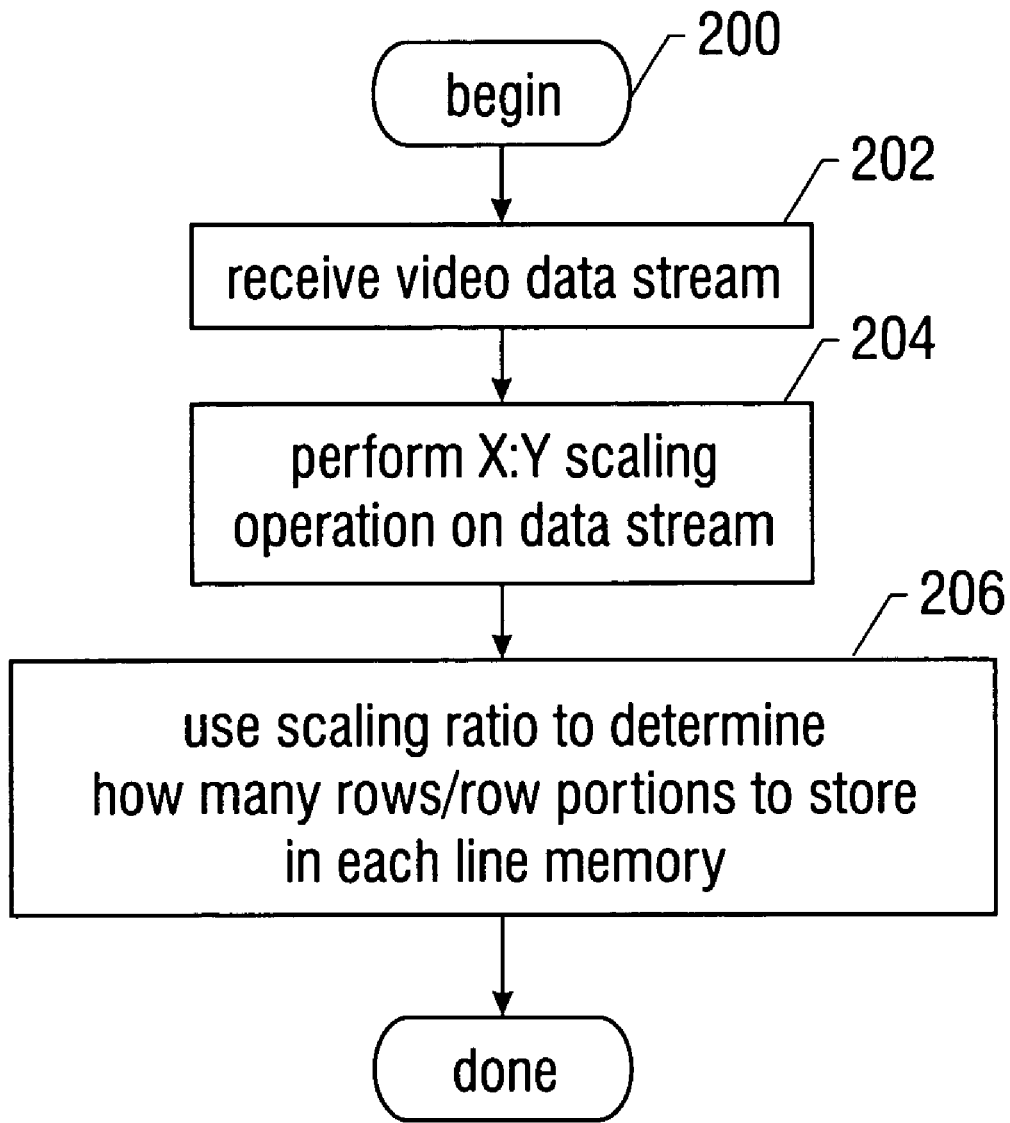
FIG. 6 is a flow diagram of a horizontal scaling operation according to one embodiment of the invention.

In FIG. 6, a flow diagram illustrates operation of the software program 200, running in the scaling control unit 28, to direct the horizontal scaler 26 and the memory controller 24 to store rows 58 of video data such as depicted in FIGS. 5A–5C, above. The adaptive filter 100 receives the video data stream 20, such as into the FIFO 18 of FIG. 1 (block 202). The horizontal scaler 26 performs an X:Y scaling operation on the video data stream 20 (block 204), where Y/X represents the scaling ratio. For example, a 4:1 scaling operation would scale down the data by a factor of four, for a ¼ scaling ratio.

Once the scaling ratio is determined, the scaling control unit 28 uses the ratio to direct the horizontal scaler 26 to store the scaled data 30 in the memory 22 accordingly (block 206). In one embodiment, X/Y rows of the scaled video data 30 are stored in each line memory (block 210), until all line memories 48 have been accessed. So, for 4:1 scaling, each line memory 48 stores four rows, where previously only a single row was stored. In this manner, the horizontally scaled video data 30 is optimally stored in the memory 22.

The scaling ratio does not always produce an integer number of rows in the line memory 48. Thus, in some embodiments, a portion of a row may be stored in one line memory 48 following horizontal scaling. For example, where 10:4 horizontal scaling is performed, a ⅖ scaling ratio results, such that 2½ rows of the scaled video data 30 are stored in each line memory 48. In other embodiments, the scaling ratio is such that different line memories 48 may store different number of rows.

Figure 7:
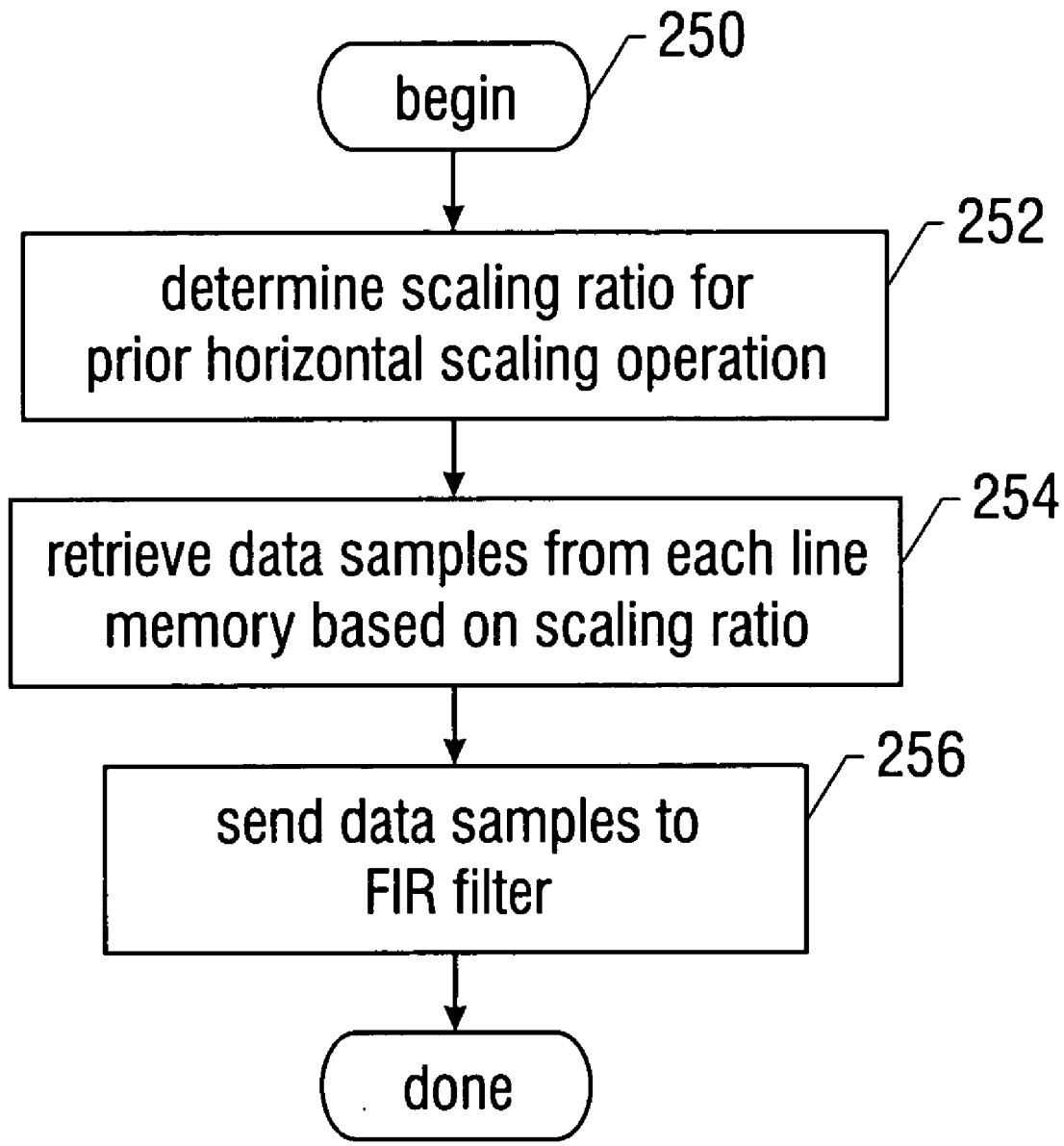
FIG. 7 is a flow diagram of a vertical scaling operation according to one embodiment of the invention.

In some embodiments, the vertical scaler 36 may access additional data samples as a result of the optimal storage. In one embodiment, the software 200 of the scaling control unit 28 may direct the vertical scaler 36, as depicted in the flow diagram of FIG. 7. First, the vertical scaler 36 determines the scaling ratio X:Y for a prior horizontal scaling operation that was performed (block 252). In one embodiment, the vertical scaler 36 retrieves this information from the scaling control unit 28. As during the prior store operation (FIG. 6), the vertical scaler 36 accesses the line memories 48 of the memory 22, starting from the first line memory 48.

In one embodiment, from each line memory 48, X/Y data samples are retrieved (block 254), e.g., the inverse of the scaling ratio. Depending on the value of X/Y, the number of data samples may be different for different line memories 48 of the memory 22. For example, where a 10:2 scaling operation is performed, two and ½ rows of data are stored in each line memory 48, according to one embodiment. The ½-row may or not include the desired data sample, however. Thus, a line memory 48 may provide three data samples, while a subsequent line memory 48 provides two data samples, then the following line memory provides three data samples, and so on.

Once the last line memory 48 is reached, the data samples are sent to the FIR filter of the vertical scaler 36 (block 256). Thus, according to one embodiment, the vertical scaler 36 may produce the scaled video data stream 40.

Because the vertical scaler 36 has access to more data samples 52 stored in the memory 22 than would typically be available, the number of taps used by the FIR filter 70 in the vertical scaler 36 may likewise be increased. The number of taps essentially corresponds to the number of coefficients 62 used to generate a product with the data samples 52 prior to performing a summation operation (see FIG. 3).

Accordingly, in one embodiment, following the horizontal scaling operation, the scaling control unit 28 supplies the vertical scaler 36 with the number of taps to be used by its FIR filter 70. Likewise, the scaling control unit 28 sends the vertical scaler 36 a new set of coefficients 62, corresponding to the number of taps. In one embodiment, the number of taps used by the FIR filter 70 in the vertical scaler 36 is equal to the number of rows 58 stored in the memory 22 plus one. The number of rows 58 corresponds to the number of available vertical data samples 52, and the additional value accounts for the fact that the current sample retrieved from the video data stream 20 need not be stored before vertical scaling.

The number of available line memories 48 which are accessible to the vertical scaler 36 depend on a number factors, including the speed at which the video data stream 20 is being transmitted, the size of the memory 22, the desired speed of the scaled video data stream 40 and other factors. In some embodiments, the adaptive filter 100 may flexibly be implemented in a variety of environments.

The scaling ratio for both horizontal scaling and vertical scaling are considered by the adaptive filter 100, according to several embodiments. For example, in one embodiment, the adaptive filter 100 performs the operations described herein when the scaling ratio of the horizontal scaler 26 is identical to the scaling ratio of the vertical scaler 36. In another embodiment, the adaptive filter operates where the horizontal scaling ratio is not the same as the vertical scaling ratio.

Thus, in one embodiment, an adaptive filter may optimize the storage of a scaled data stream such that more robust scaling may be performed. Where a scaling operation has been performed on a data stream, storage of the scaled data may be increased in some embodiments. Where the number of available data samples for subsequent scaling operations has increased, the size of FIR or other filters used during the subsequent scaling may be increased. Coefficients may likewise be supplied to the filter where its size is increased. In some embodiments, subsequent scaling operation enhances the scaled output without adding cost to the adaptive filter.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method comprising:
  scaling a first portion and a second portion of image information to provide a scaled first portion and a scaled second portion that fit entirely within an addressable first memory area, wherein unscaled said first portion would substantially fill the first memory area; and
  storing said scaled first portion and said scaled second portion entirely in said first memory area.

2. The method of claim 1, further comprising:
  accessing the scaled first or second portion from the first memory area;
  retrieving a data sample from one of the scaled portions; and
  using the data sample in a second scaling operation.

3. The method of claim 1, further comprising:
  dividing a memory into a plurality of lines;
  identifying a line; and
  storing a number of scaled portions in the line, wherein scaling the first portion and the second portion is based on a scaling ratio, and the number is related to the scaling ratio.

4. A system comprising:
  a memory comprising a number of bytes;
  a scaler to perform a scaling operation, the scaling operation identifiable by a scaling ratio, wherein the scaler scales a first portion and a second portion of image information to provide a scaled first portion and a scaled second portion that fit entirely within addressable two-memory area, and unscaled said first portion would substantially fill the first memory area; and
  a memory controller coupled to the memory to store said scaled first portion and said scaled second portion entirely in said first memory area.

5. The system of claim 4, wherein the image information is a video data stream.

6. The system of claim 5, wherein the image information comprises a plurality of frames and each frame comprises a predetermined number of bytes.

7. The system of claim 6, wherein the number of bytes in the memory is smaller than the predetermined number of bytes.

8. The system of claim 4, wherein the scaling operation is a horizontal scaling operation.

9. The system of claim 4, further comprising:
a second scaler to perform a second scaling operation, identifiable by a second scaling ratio.

10. The system of claim 9, wherein the second scaling ratio is identical to the first scaling ratio.

11. The system of claim 9, wherein the second scaling operation is a vertical scaling operation.

12. The system of claim 9, further comprising:
a scaling control unit coupled to the second scaler, wherein the second scaler further comprises a finite impulse response filter including a plurality of coefficients and the scaling control unit changes the amount of coefficients in the filter in relation to the scaling ratio.

13. The system of claim 12, wherein the scaling control unit further comprises a look-up table including coefficient values for changing the amount of coefficients.

14. The system of claim 4, further comprising a first-in-first-out memory.

15. The system of claim 4, wherein the memory is an on-chip memory.

16. An article comprising a medium storing instructions that, if executed, enable a processor-based system to:
scale a first portion and a second portion of image information to provide a scaled first portion and a scaled second portion that fit entirely within an addressable first memory area, wherein unscaled said first portion would substantially fill a first memory area; and
store said scaled first portion and said scaled second portion entirely in said first memory area.

17. The article of claim 16, further storing instructions that, if executed, enable a processor-based system to:
access the scaled first or second portion from the first memory area;
retrieve a data sample from one of the scaled portions; and
use the data sample in a second scaling operation.

18. The article of claim 16, further storing instructions that, if executed, enable a processor-based system to:
divide a memory into a plurality of lines;
identify a line of the plurality of lines; and
store a number of scaled portions in the line, wherein scaling the first portion and the second portion is based on a scaling ratio, and the number is related to the scaling ratio.

* * * * *